United States Patent
Cui et al.

(10) Patent No.: US 11,809,237 B2
(45) Date of Patent: Nov. 7, 2023

(54) HINGE ANGLE DETECTION

(71) Applicant: Intel Corporation, Santa Clara, CA (US)

(72) Inventors: Renjie Cui, Shanghai (CN); Ke Han, Shanghai (CN); Hemin Han, Shanghai (CN); Lili Ma, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/763,953

(22) PCT Filed: Dec. 27, 2019

(86) PCT No.: PCT/CN2019/129066
§ 371 (c)(1),
(2) Date: Mar. 25, 2022

(87) PCT Pub. No.: WO2021/128245
PCT Pub. Date: Jul. 1, 2021

(65) Prior Publication Data
US 2022/0350373 A1    Nov. 3, 2022

(51) Int. Cl.
*G09G 5/00*  (2006.01)
*G06F 1/16*  (2006.01)
*G01B 7/30*  (2006.01)

(52) U.S. Cl.
CPC ............ *G06F 1/1677* (2013.01); *G01B 7/30* (2013.01); *G06F 1/1618* (2013.01)

(58) Field of Classification Search
CPC .... G06F 1/1618; G06F 1/1652; G06F 1/1677; G06F 1/1681; G06F 1/1694;
(Continued)

(56) References Cited

U.S. PATENT DOCUMENTS 10,204,592 B1 *   2/2019   Trim .................... G06F 1/1601
10,747,272 B1 *   8/2020   Morrison ............. G06F 1/1677
(Continued)

FOREIGN PATENT DOCUMENTS

CN   105765500 A   7/2016
CN   106289249 A   1/2017
(Continued)

OTHER PUBLICATIONS

PCT International Search Report and Written Opinion issued in PCT/CN2019/129066 dated Sep. 25, 2020; 11 pages.

*Primary Examiner* — Joe H Cheng
(74) *Attorney, Agent, or Firm* — Patent Capital Group

(57) ABSTRACT

Particular embodiments described herein provide for an electronic device that includes a first housing, where the first housing includes at least one first housing accelerometer and at least one first housing gyroscope, a second housing, where the second housing includes at least one second housing accelerometer and at least one second housing gyroscope, and a hinge. The hinge rotatably couples the first housing to the second housing, where a hinge angle is determined using data from the first housing accelerometer, the second housing accelerometer, the first housing gyroscope, and the second housing gyroscope if the electronic device is not in a portrait orientation where the hinge is vertical to a ground or not in motion and is determined using data from the first housing gyroscope and the second housing gyroscope if the electronic device is in portrait orientation or is in motion.

19 Claims, 9 Drawing Sheets

(58) Field of Classification Search
CPC .......... G06F 2203/04102; G09F 9/301; G09G 2380/02; G01B 7/30
See application file for complete search history.

(56) References Cited

U.S. PATENT DOCUMENTS

| | | | | |
|---|---|---|---|---|
| 11,281,814 | B2* | 3/2022 | He | G06F 21/6245 |
| 2011/0216064 | A1* | 9/2011 | Dahl | H04M 1/0247 345/428 |
| 2015/0116362 | A1 | 4/2015 | Aurongzeb et al. | |
| 2015/0116364 | A1* | 4/2015 | Aurongzeb | G06F 1/1649 345/659 |
| 2015/0130725 | A1* | 5/2015 | Knepper | G06F 3/017 345/173 |
| 2018/0060010 | A1* | 3/2018 | Cho | G06F 1/1652 |
| 2018/0329672 | A1* | 11/2018 | Sadak | G06F 3/0487 |
| 2018/0340768 | A1* | 11/2018 | Zancanato | G01P 15/18 |
| 2018/0356904 | A1* | 12/2018 | Disano | G06F 3/0488 |
| 2019/0163432 | A1* | 5/2019 | Files | G06F 3/147 |
| 2019/0278323 | A1* | 9/2019 | Aurongzeb | G06F 1/3265 |
| 2020/0159289 | A1* | 5/2020 | Seibert | G06F 3/04886 |
| 2020/0227000 | A1* | 7/2020 | Liu | G06V 40/16 |
| 2020/0304185 | A1* | 9/2020 | Tsai | H04B 7/0802 |
| 2020/0348745 | A1* | 11/2020 | Hamlin | G06F 3/017 |
| 2021/0096606 | A1* | 4/2021 | Hamlin | G06F 1/1694 |
| 2021/0096611 | A1* | 4/2021 | Schenone | G06F 1/1686 |

FOREIGN PATENT DOCUMENTS

| | | |
|---|---|---|
| CN | 107210027 A | 9/2017 |
| CN | 108958362 A | 12/2018 |
| CN | 109917858 A | 6/2019 |
| CN | 110286972 A | 9/2019 |
| CN | 114787746 A | 7/2022 |
| EP | 4014102 A1 | 6/2022 |
| WO | 2021128245 A1 | 7/2021 |

* cited by examiner

HINGE ANGLE DETECTION

This application is a national stage application under 35 U.S.C. § 371 of PCT International Application Serial No. PCT/CN2019/129066, filed on Dec. 27, 2019 and entitled "Hinge Angle Detection", which application is considered part of and is hereby incorporated by reference in its entirely in the disclosure of this application.

TECHNICAL FIELD

This disclosure relates in general to the field of computing, and more particularly, to a hinge angle detection system.

BACKGROUND

End users have more electronic device choices than ever before. A number of prominent technological trends are currently afoot and these trends are changing the electronic device landscape. Some of the technological trends involve a device that includes a first housing that can rotate three hundred and sixty degrees relative to a second housing. These devices have different configurations depending on the hinge angle and the location of the first housing relative to the second housing and if the device is in a landscape orientation or a portrait configuration.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
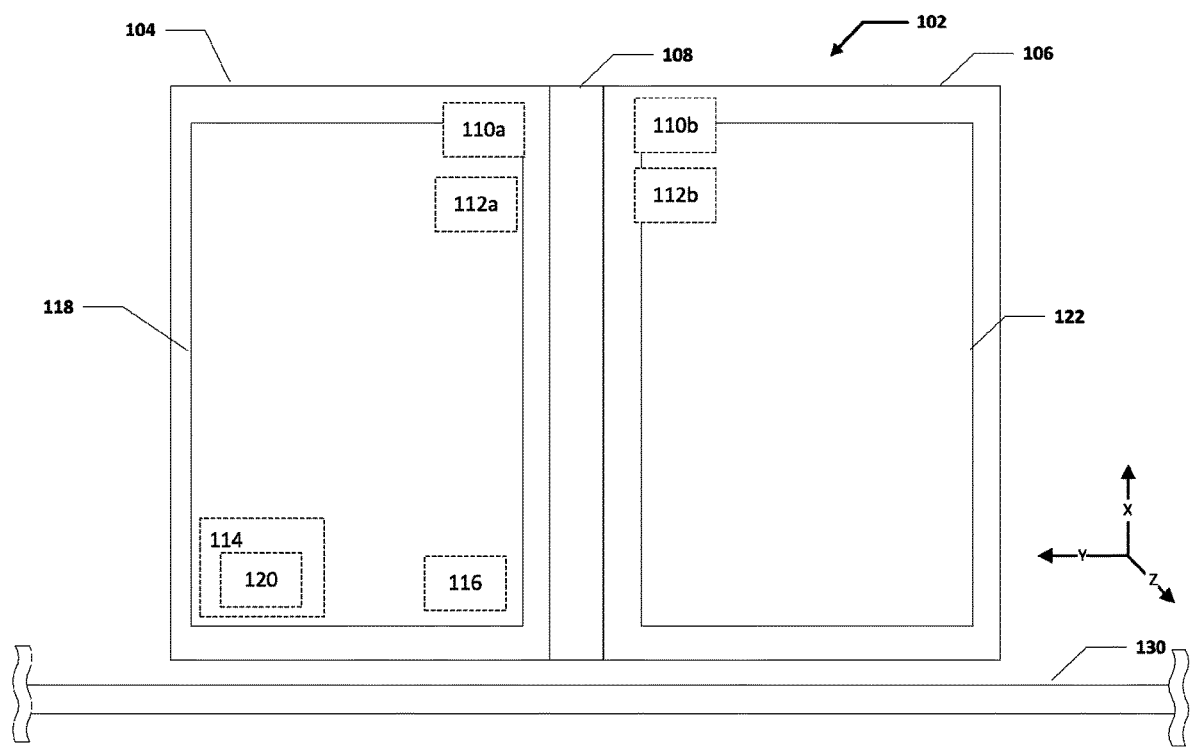
FIG. 1A is a simplified block diagram of a system to enable a hinge angle detection system, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a hinge angle detection system in accordance with an embodiment of the present disclosure. The term "hinge angle" includes the location of a first housing relative to a second housing as the first housing is rotated on a hinge relative to the second housing. The term "hinge orientation" includes the orientation of the hinge relative to the ground and is used to determine if a hinge is in a portrait orientation or a landscape orientation. The hinge orientation can be determined by the positional relationship between the hinge and the ground. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer or component disposed over or under another layer or component may be directly in contact with the other layer or component or may have one or more intervening layers or components. Moreover, one layer or component disposed between two layers or components may be directly in contact with the two layers or components or may have one or more intervening layers or components. In contrast, a first layer or first component "directly on" a second layer or second component is in direct contact with that second layer or second component. Similarly, unless explicitly stated otherwise, one feature disposed between two features may be in direct contact with the adjacent features or may have one or more intervening layers.

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

Figure 1B:
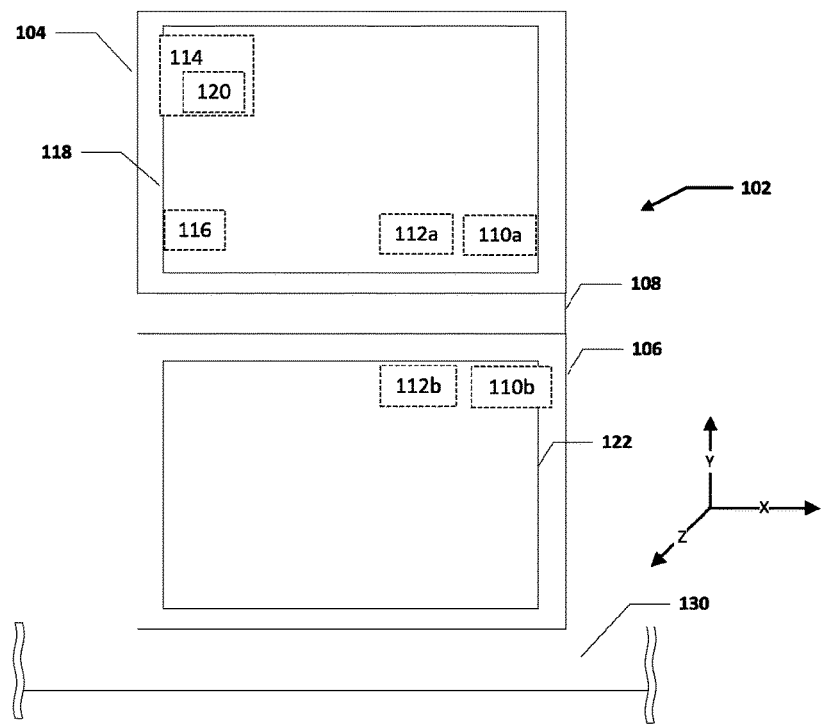
FIG. 1B is a simplified block diagram of a system to enable a hinge angle detection system, in accordance with an embodiment of the present disclosure.

FIG. 1A is a simplified block diagram of an electronic device configured to enable a hinge angle detection system, in accordance with an embodiment of the present disclosure. In an example, an electronic device 102 can include a first housing 104 and a second housing 106. First housing 104 can be rotatably coupled to second housing 106 using a hinge 108. In an example, first housing 104 can be rotated about three hundred and sixty degrees relative to second housing 106. First housing 104 can include at least one first housing accelerometer 110a, at least one first housing gyroscope 112a, a hinge angle detection engine 114, a display orientation engine 116, and a first housing display 118. Hinge angle detection engine 114 can include a state transition engine 120. Second housing 106 can include at least one second housing accelerometer 110b, at least one second housing gyroscope 112b, and a second housing display 122. As illustrated in FIG. 1A, electronic device 102 is in an open mode configuration in a portrait orientation. Turning to FIG. 1B, FIG. 1B is a simplified block diagram of electronic device 102 when electronic device 102 is rotated ninety degrees. As illustrated in FIG. 1B, electronic device 102 is in an open mode configuration in a landscape orientation.

Figure 1C:
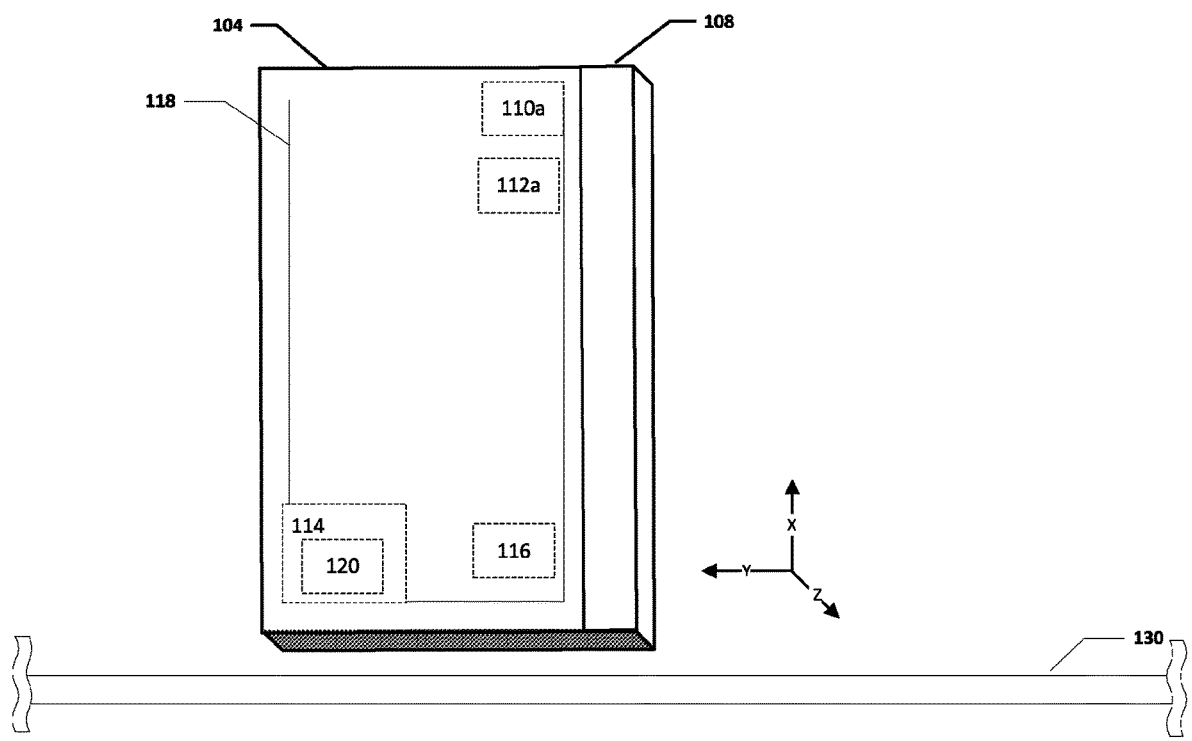
FIG. 1C is a simplified block diagram of a system to enable a hinge angle detection system, in accordance with an embodiment of the present disclosure.
Figure 1D:
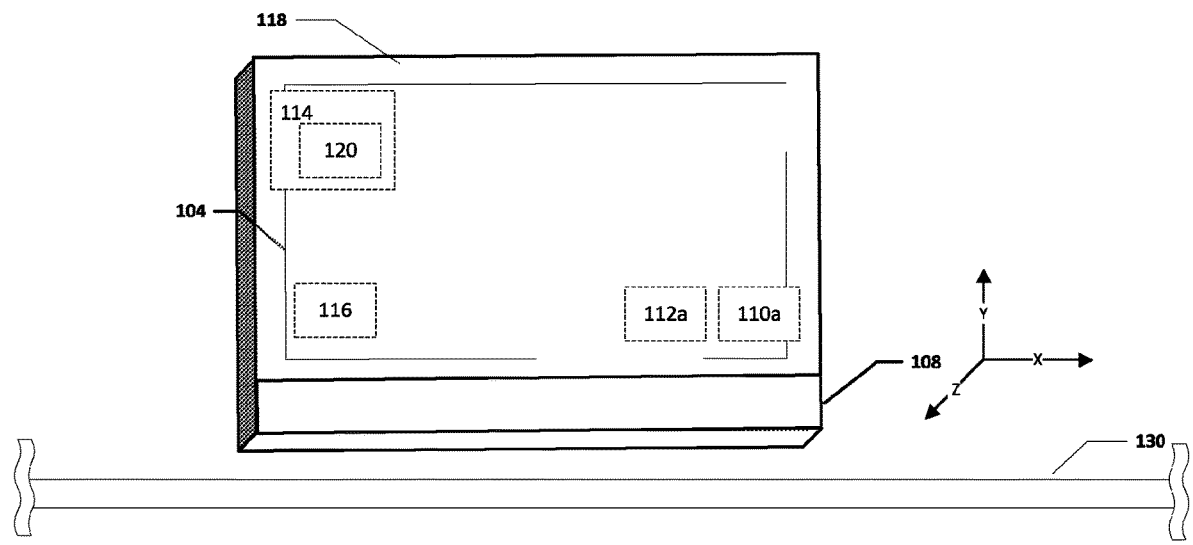
FIG. 1D is a simplified block diagram of a system to enable a hinge angle detection system, in accordance with an embodiment of the present disclosure.

Turning to FIG. 1C, FIG. 1C is a simplified block diagram of electronic device 102 in a tablet mode configuration in a portrait orientation. In the tablet mode configuration, first housing display 118 and second housing display 122 face opposite directions. In an example, electronic device 102 can be in a close clamshell configuration where first housing display 118 faces second housing display 122. As illustrated in FIG. 1C, electronic device 102 is in a tablet mode configuration in a portrait orientation. Turning to FIG. 1D, FIG. 1D is a simplified block diagram of electronic device 102 when electronic device 102 is rotated ninety degrees. As illustrated in FIG. 1D, electronic device 102 is in a tablet mode configuration in a landscape orientation. In an example, when electronic device is in an open mode configuration in a portrait orientation, as illustrated in FIG. 1A, a tablet mode configuration in a portrait orientation, as illustrated in FIG. 1C, or any other portrait orientation, hinge 108 is vertical to ground 130. When electronic device is in an open mode configuration in a landscape orientation, as illustrated in FIG. 1B, a tablet mode configuration in a landscape orientation, as illustrated in FIG. 1D, or any other landscape orientation, hinge 108 is horizontal to ground 130.

First housing accelerometer 110a can be configured to determine an angle of first housing 104 relative to ground 130 and second housing accelerometer 110b can be configured to determine an angle of second housing 106 relative to ground 130 using inclination sensing. Inclination sensing uses a gravity vector to determine the tilt angle of a housing. More specifically, first housing accelerometer 110a can use a projection of a gravity vector on the axes of first housing accelerometer 110a to determine the tilt angle of first housing 104 relative to ground 130 and second housing accelerometer 110b can use a projection of the gravity vector on the axes of second housing accelerometer 110b to determine the tilt angle of second housing 106 relative to ground 130. When electronic device 102 is not in motion or in a portrait orientation where hinge 108 is vertical to ground 130, hinge angle detection engine 114 can be configured to use the data from first housing accelerometer 110a and second housing accelerometer 110b to determine an angle of first housing 104 relative to second housing 106. The term "in motion" includes the process of being moved from one location to another location. In an example, display orientation engine 116 can be configured to orient an image shown on first housing display 118 and/or second housing display 122 based on the determined angle of first housing 104 relative to second housing 106 and the orientation of hinge 108.

When electronic device 102 is in motion or in a portrait orientation where hinge 108 is vertical to ground 130, as illustrated in FIGS. 1A and FIG. 1C, often the angle of first housing 104 relative to ground 130 and second housing 106 relative to ground 130 as determined by first housing accelerometer 110a and second housing accelerometer 110b can be inaccurate or not able to be determined. More specifically, when electronic device 102 is in motion, the output of from first housing accelerometer 110a and second housing accelerometer 110b is influenced by the linear acceleration of the movement of electronic device 102 and the gravity vector changing with the movement. As a result, the data derived from first housing accelerometer 110a and second housing accelerometer 110b can be inaccurate. In addition, when electronic device 102 is in a portrait orientation where hinge 108 is vertical to ground 130, the gravity vector of first housing accelerometer 110a and second housing accelerometer 110b is parallel with hinge 108 the data from first housing accelerometer 110a and second housing accelerometer 110b may not even be able to be used for calculating the angle of first housing 104 relative to second housing 106 and the hinge angle is unable to be determined. As a result, the hinge angle cannot be accurately detected when electronic device 102 is in a portrait orientation where hinge 108 is vertical to ground 130 or when electronic device 102 is in motion.

In an example, first housing gyroscope 112a and second housing gyroscope 112b can be configured to generated angular velocity data. The angular velocity data from first housing gyroscope 112a and second housing gyroscope 112b can be used by state transition engine 120 to help determine the angle of first housing 104 relative to second housing 106 when electronic device 102 is in motion or in a portrait orientation where hinge 108 is vertical to ground 130. More specifically, data from first housing gyroscope 112a and second housing gyroscope 112b can be integrated and combined by hinge angle detection engine 114 and/or state transition engine 120 to help determine the angle of first housing 104 relative to second housing 106. In an example, first housing accelerometer 110a and/or second housing accelerometer 110b can be used to determine the hinge orientation by determining the positional relationship between the hinge and the ground.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of electronic device 102, the following foundational information may be viewed as a basis from which the present disclosure may be properly explained. Generally, clamshell devices are devices where a first housing is rotatably coupled to a second housing. For example, a clamshell device can be a laptop, notebook computer or other a small, portable personal computer with a clamshell form factor. Some devices have a first display mounted on the inside of a first housing of the clamshell and an alphanumeric keyboard or a second display on the inside of a second housing of the clamshell. The clamshell is opened to use the device and folded shut for transportation or storage. Some current clamshell devices include a foldable display system where the first housing can rotate about three hundred and sixty degrees relative to the second housing.

With the ever-increasing types of compute device form factors there is the ever increasing need to make devices smarter and context aware. Some of the interesting form factors include three-in-ones, two-in-ones, dual screen devices, folding display systems, etc. For these devices, and other similar devices, there is a unique requirement where the device is self-aware of the mode of the device. For example, a foldable display system can be in a laptop mode configuration, an open mode configuration, a tablet mode configuration, or some other configuration mode. In addition, while in the laptop mode configuration, open mode configuration, tablet mode configuration or some other configuration mode, the foldable display system may be in a portrait orientation where the hinge is vertical to the ground, a landscape orientation where the hinge is horizontal to the ground, or some other orientation. The mode of the device depends on the location of the first housing relative to the second housing as the first housing is rotated relative to the second housing about a hinge and the orientation of the hinge relative to the ground. Because the mode of the device depends on the location of the first housing relative to the second housing and the orientation of the hinge, it is necessary to accurately determine the hinge angle and the orientation of the hinge relative to the ground.

Hinge angle refers to the location of the first housing relative to the second housing and can be used to detect the configuration mode or platform state of the device. Hinge angle is important for devices where the first housing can rotate relative to the second housing, especially where the first housing can rotate about three hundred and sixty degrees relative to the second housing as such devices typically have several configuration modes to distinguish. Also supporting high accurate hinge measurement when device is in motion becomes critical, because dual-screen device is designed for mobility.

Currently there are several systems to detect the hinge angle. For example, rotational encoder systems are very accurate but they are also relatively expensive. Systems based on optical encoders are larger than 5 mm, and are too large for hinges and often have problems with dust and other particulate interferences. Magnetopot based systems can be reliable but are also relatively expensive and can have a high variability and tolerance. Resistive encoder-based systems are contact based sensors and are prone to contact jitters and wear and tear which does not make them a good long-term solution. Capacitive proximity sensors are able to read proximity of even nonmetallic parts but this can cause wrong or false readings. Also, they can be difficult to implement as the capacitive proximity front end is analog circuit design intensive and also needs complex designs to make it reliable. Capacitive proximity sensors also need adaptation to measure rotary angles and three hundred and sixty degrees of movement.

Currently, one common method of calculating the hinge angle uses a gravity vector that is based on the data of two accelerometers separately placed in a first housing and in a second housing. However, usage of a gravity vector based on the data of accelerometers has drawbacks, even if they have no critical impact on traditional convertible systems. For example, systems that rely on accelerometers to determine the hinge angle cannot support determining the hinge angle in a portrait orientation where the hinge is vertical to the ground or when the device is in motion because angle precision will decrease when the device is in motion. What is needed is system and method that can help to detect a position of a hinge of an electronic device.

A system and method to help facilitate a hinge angle detection system can resolve these issues (and others). In an example, an electronic device (e.g., electronic device 102) can include a plurality of accelerometers and a plurality of gyroscopes. More specifically, a first housing (e.g., first housing 104) of the electronic device can include one or more accelerometers (e.g., first housing accelerometer 110a) and one or more gyroscopes (e.g., first housing gyroscope 112a) and a second housing (e.g., second housing 106) of the electronic device can include one or more accelerometers (e.g., second housing accelerometer 110b) and one or more gyroscopes (e.g., second housing gyroscope 112b).

In an example, the accelerometers can be used to determine a position of the first housing relative to the second housing. More specifically, a hinge angle can be determined using accelerometers and the hinge angle can be used as the angle between the first housing relative to the second housing. The hinge angle using accelerometers is calculated as:

$$\theta = \theta_1 - \theta_2$$

Where $\theta_1$ is the angle of the first housing relative to a horizontal plane and $\theta_2$ is the angle of the second housing relative to the horizontal plane.

The angle of the first housing and the horizontal plane is:

$$\theta_1 = a\tan2\left(\frac{a_{1z}}{a_{1y}}\right) + \frac{\pi}{2}$$

Where, $a_{1z}$ is the component of gravity on the Z axis of the accelerometer located in the first housing, and $a_{1y}$ is the component of gravity on the Y axis of accelerometer located in the first housing.

The angle between the second housing and the horizontal plane is:

$$\theta_2 = a\tan2\left(\frac{a_{2z}}{a_{2y}}\right) - \frac{\pi}{2}$$

Where, $a_{2z}$ is the component of gravity on the Z axis of the accelerometer located in the second housing, and $a_{2y}$ is the component of gravity on the Y axis of accelerometer located in the second housing.

While the accelerometers can be used to determine the hinge angle and the angle between the first housing relative to the second housing in some orientations, when the electronic device is vertical to the ground, then the gravity vector is vertical to the z-axis so the value is zero and cannot be used to calculate the hinge angle using the above formula. Also, if the electronic device is in motion, then the accelerometers will detect the movement and the hinge angle precision will decrease or even become invalid in some cases.

To help determine the hinge angle and the angle between the first housing relative to the second housing while a device is in a portrait orientation where the hinge is vertical to the ground and/or while the device is in motion, a plurality of gyroscopes can be used. For example, the first housing of the electronic device can include one or more gyroscopes (e.g., first housing 104 can include first housing gyroscope 112a) and the second housing of the electronic device can include one or more gyroscopes (e.g., second housing 106 can include second housing gyroscope 112b). The plurality of gyroscopes can be used to help calculate the hinge angle when the electronic device is in a portrait orientation where the hinge is vertical to the ground and/or is in motion. In addition, the plurality of gyroscopes can be used to help determine a more precise hinge angle than the hinge angle determined by the accelerometers when the electronic device is in a portrait orientation where the hinge is vertical to the ground and/or is in motion.

In a specific example, angular velocity data from the plurality of gyroscopes can be used by a state transition engine (e.g., state transition engine 120) to help determine a hinge angle. The state transition engine can be configured to determine a prediction of where the hinge angle of electronic device was position and where the hinge angle of the electronic device is going to be positioned.

In an illustrative example, electronic device can include two gyroscopes and two accelerometers. Most specifically, a first housing of the electronic device can include a first accelerometer and a first gyroscope and a second housing of the electronic device can include a second accelerometer and a second gyroscope. The electronic device can also include a state transition engine and a measurement correction engine (e.g., hinge angle detection engine 114) to collect the acceleration data from the accelerometers, the angular velocity data from the gyroscopes, integrate the angular velocity data from the gyroscopes and fuse the data to determine an hinge angle.

In a specific example, when the electronic device is determined to be in a portrait orientation where the hinge is vertical to the ground or in motion, then the hinge angle is not based on acceleration data from the accelerometers because the acceleration data from the accelerometers is invalid or can be inaccurate. When the electronic device is determined to be in a portrait orientation where the hinge is vertical to the ground or in motion, then the hinge angle can be estimated from the angular velocity data from the gyroscopes. In other modes, the hinge angle can be a fusion of the acceleration data from the accelerometers and the angular velocity data from the gyroscopes.

In a specific example, a Kalman filter, or some other similar filter, algorithm, etc. can be used by state transition engine 120 to determine state transition data. Generally, Kalman filtering, also known as linear quadratic estimation, is an algorithm that uses a series of measurements observed over time and produces estimates of unknown variables that tend to be more accurate than those based on a single measurement alone by estimating a joint probability distribution over the variables for each timeframe. The Kalman filter uses a system's dynamic model (e.g., physical laws of motion), known control inputs to the system, and multiple sequential measurements (e.g., from first housing accelerometer 110a, second housing accelerometer 110b, first housing gyroscope 112a, and second housing gyroscope 112b) to form an estimate of the system's varying quantities (its state or hinge angle) that is better than the estimate obtained by using only one measurement alone.

The Kalman filter works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. The Kalman filter is recursive and can run in real time, using only the present input measurements and the previously calculated state and its uncertainty matrix.

The purpose of the weighted values is that values with better (i.e., smaller) estimated uncertainty are "trusted" more. The weights for the values are calculated from the covariance, a measure of the estimated uncertainty of the prediction of the system's state. The result of the weighted average is a new state estimate that lies between the predicted and measured state. This process is repeated, with the new estimate and its covariance informing the prediction used in the following iteration. This means that the Kalman filter works recursively and requires only the last "best guess," rather than the entire history of a system's state to calculate a new state. While the examples discuss a Kalman filter, other filters, algorithms, etc. that uses estimates and measurements with the addition of noise and other inaccuracies may also be used.

In a specific example, state transition engine 120 can be configured to determine the state transition data using a linear differential equation of the system as follows:

$$\begin{cases} \theta_k = \theta_{k-1} + \Delta t \times (\dot{\theta}_{g1,k} - \dot{\theta}_{g2,k} - \dot{\theta}_{b,k-1}) + \omega_k \\ \dot{\theta}_{b,k} = \dot{\theta}_{b,k-1} \end{cases}$$

$$\hat{x}_k = \begin{bmatrix} \theta_k \\ \dot{\theta}_{b,k} \end{bmatrix}, F_k = \begin{bmatrix} 1 & -\Delta t \\ 0 & 1 \end{bmatrix}, B_k = \begin{bmatrix} \Delta t \\ 0 \end{bmatrix} \omega_k \sim N(0, Q_k), u_k = (\dot{\theta}_{g1,k} - \dot{\theta}_{g2,k})$$

Where, $\theta_k$ is the hinge angle at time k, $\theta_{k-1}$ is the hinge angle at time k−1, $\dot{\theta}_{b,k}$ is the bias difference of the first housing gyroscope and the second housing gyroscope at time k, $\Delta t$ is the time interval for integration, $\dot{\theta}_{g1,k}$ is the angle velocity from the first housing gyroscope in the first housing at time k, $\dot{\theta}_{g2,k}$ is the angle velocity from the second housing gyroscope in the second housing at time k, and $\omega_k$ is the process noise.

In a specific example, hinge angle detection engine 114 can be configured to determine a corrected hinge angle using a measurement correction equation as follows:

$$\theta_{a,k} = \theta_k + v_k$$

$$y_k = \begin{bmatrix} \theta_{a,k} \\ 0 \end{bmatrix}, H_k = [1 \ 0], v_k \sim N(0, R_k)$$

Where, $\theta_{a,k}$ is the hinge angle value calculated from the plurality of accelerometers and $v_k$ is the observation noise related with the performance of the plurality of accelerometers.

In an example implementation, electronic device 102, is meant to encompass an electronic device that includes a hinge where a position of one housing in relation to another housing may need to be determined, especially a computer that has different configuration and modes based on the hinge angle, a laptop or electronic notebook, network elements that have a three hundred and sixty degree first housing rotation form factor, any other device, component, element, or object that has a three hundred and sixty degree first housing rotation form factor, design, profile, etc., or any other device, component, element, or object that has different configuration and modes based on a hinge angle. Electronic device 102 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 102 may include virtual elements.

In regards to the internal structure, electronic device 102 can include memory elements for storing information to be used in the operations outlined herein. Electronic device 102 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs.

Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic device 102 may include software modules (e.g., hinge angle detection engine 114, display orientation engine 116, state transition engine 120, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 102 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
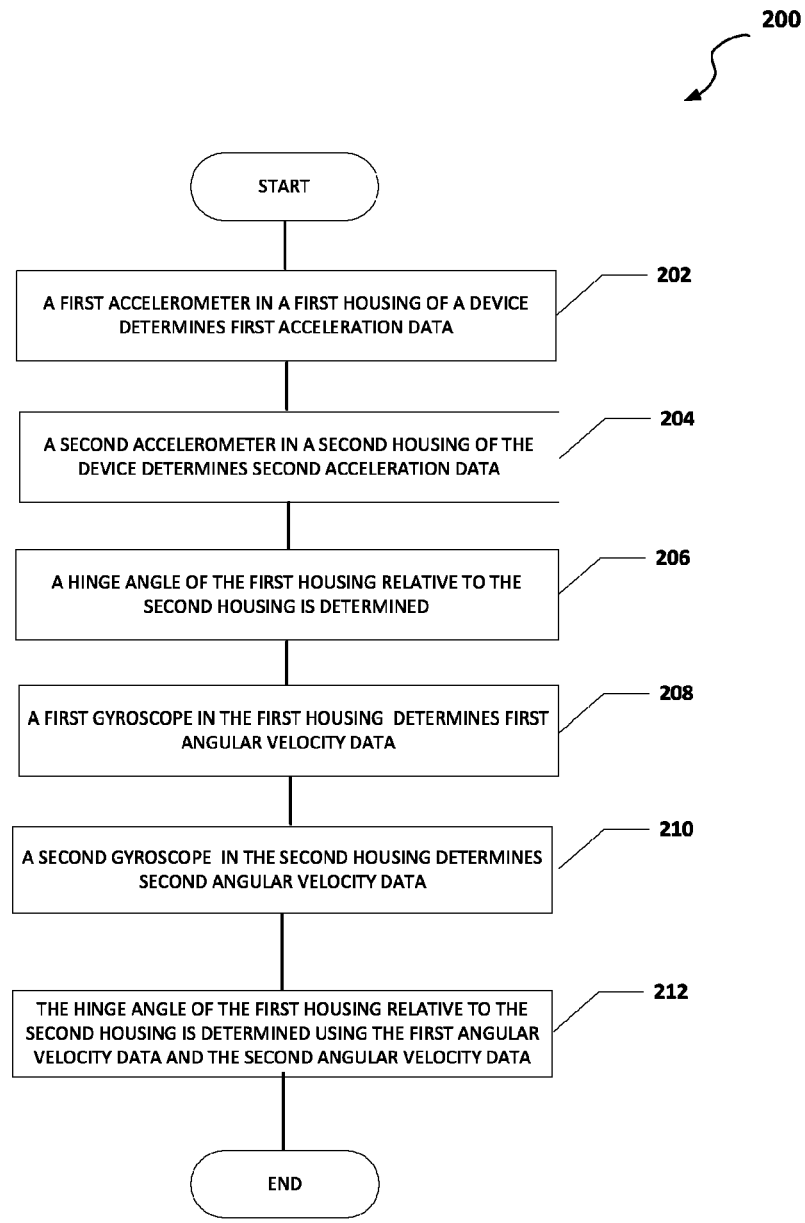
FIG. 2 is a simplified flowchart illustrating potential operations that may be associated with the system in accordance with an embodiment of the present disclosure.

Turning to FIG. 2, FIG. 2 is a is an example flowchart illustrating possible operations of a flow 200 that may be associated with enabling a hinge angle detection system, in accordance with an embodiment. In an embodiment, one or more operations of flow 200 may be performed by hinge angle detection engine 114, display orientation engine 116, and state transition engine 120. At 202, a first accelerometer in a first housing of a device determines first acceleration data. At 204, a second accelerometer in a second housing of the device determines second acceleration data. At 206, a hinge angle of the first housing relative to the second housing is determined. At 208, a first gyroscope in the first housing determines first angular velocity data. At 210, a second gyroscope in the second housing determines second angular velocity data. At 212, the hinge angle of the first housing relative to the second housing is determined using the first angular velocity data and the second angular velocity data. In an example, if the device is in a landscape orientation where the hinge is horizontal to the ground, then the angle determined using the first angular velocity data and the second angular velocity data is corrected using the data from the first accelerometer and the second accelerometer. If the device is in a portrait orientation where the hinge is vertical to the ground, then the data from the first accelerometer and the second accelerometer is not used to determine the hinge angle.

Figure 3:
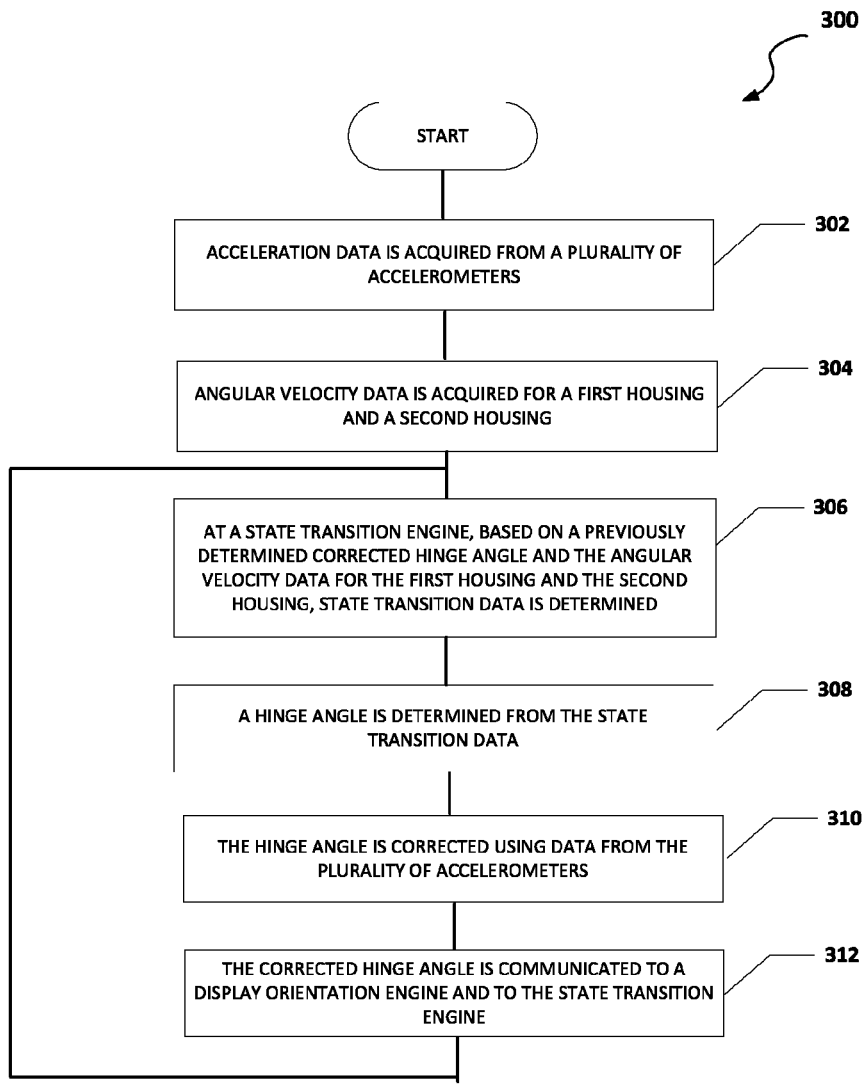
FIG. 3 is a simplified flowchart illustrating potential operations that may be associated with the system in accordance with an embodiment of the present disclosure.

Turning to FIG. 3, FIG. 3 is a is an example flowchart illustrating possible operations of a flow 300 that may be associated with enabling a hinge angle detection system, in accordance with an embodiment. In an embodiment, one or more operations of flow 300 may be performed by hinge angle detection engine 114, display orientation engine 116, and state transition engine 120. At 302, acceleration data is acquired from a plurality of accelerometers. At 304, angular velocity data is acquired for a first housing and a second housing. At 306, at a state transition engine, based on a previously determined corrected hinge angle and the angular velocity data for the first housing and the second housing, state transition data is determined. At 308, a hinge angle is determined from the state transition data. At 310, the hinge angle is corrected using the acceleration data from the plurality of accelerometers. At 312, the corrected hinge angle is communicated to a display orientation engine and the state transition engine.

Figure 4:
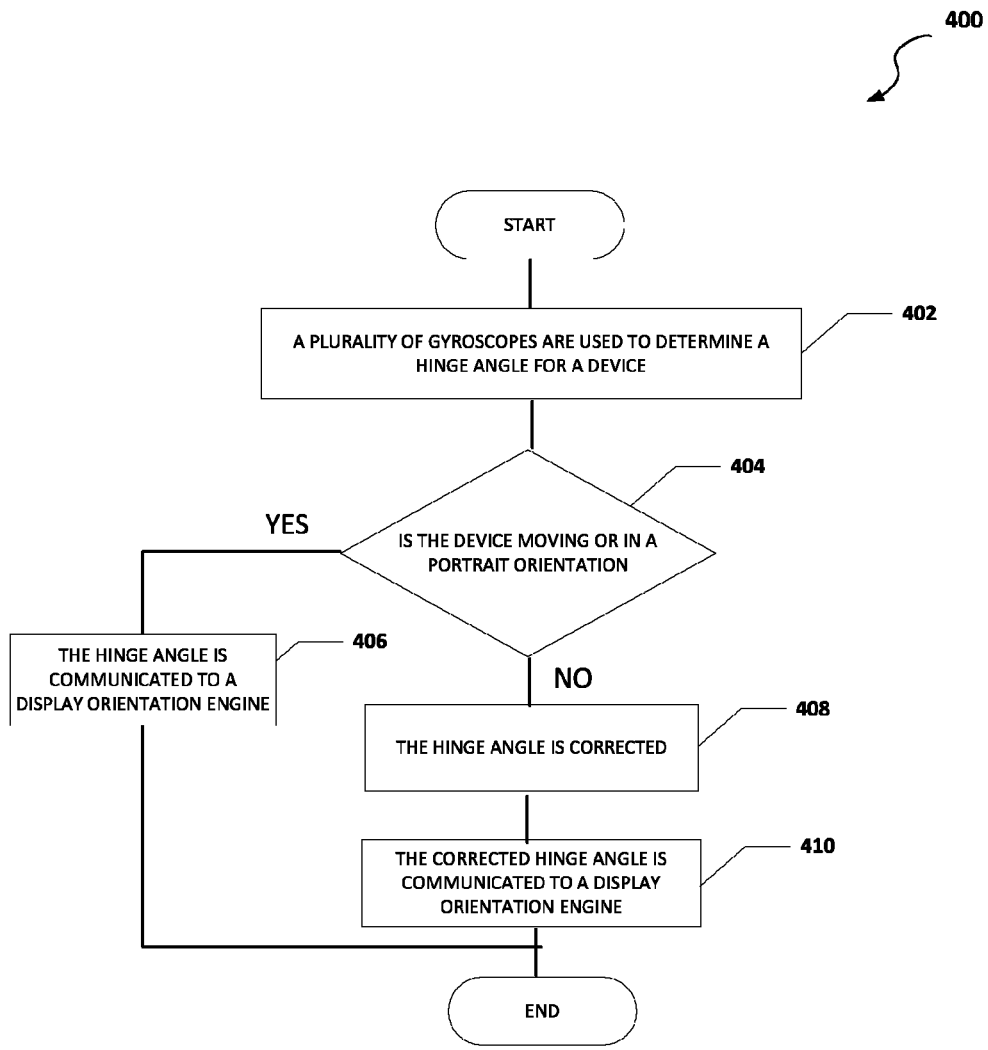
FIG. 4 is a simplified flowchart illustrating potential operations that may be associated with the system in accordance with an embodiment of the present disclosure.

Turning to FIG. 4, FIG. 4 is a is an example flowchart illustrating possible operations of a flow 400 that may be associated with enabling a hinge angle detection system, in accordance with an embodiment. In an embodiment, one or more operations of flow 400 may be performed by hinge angle detection engine 114, display orientation engine 116, and state transition engine 120. At 402, a plurality of gyroscopes are used to determine a hinge angle for a device. At 404, the system determines if the device is moving or in a portrait orientation. In an example, the device is moving if it is motion. If the device is moving or in a portrait orientation, then the hinge angle is communicated to a display orientation engine, as in 406. If the device is not moving or in a portrait orientation, then the hinge angle is corrected, as in 408. At 410, the corrected hinge angle is communicated to a display orientation engine. In an example, the hinge angle is corrected using data from a plurality of accelerometers.

Figure 5:
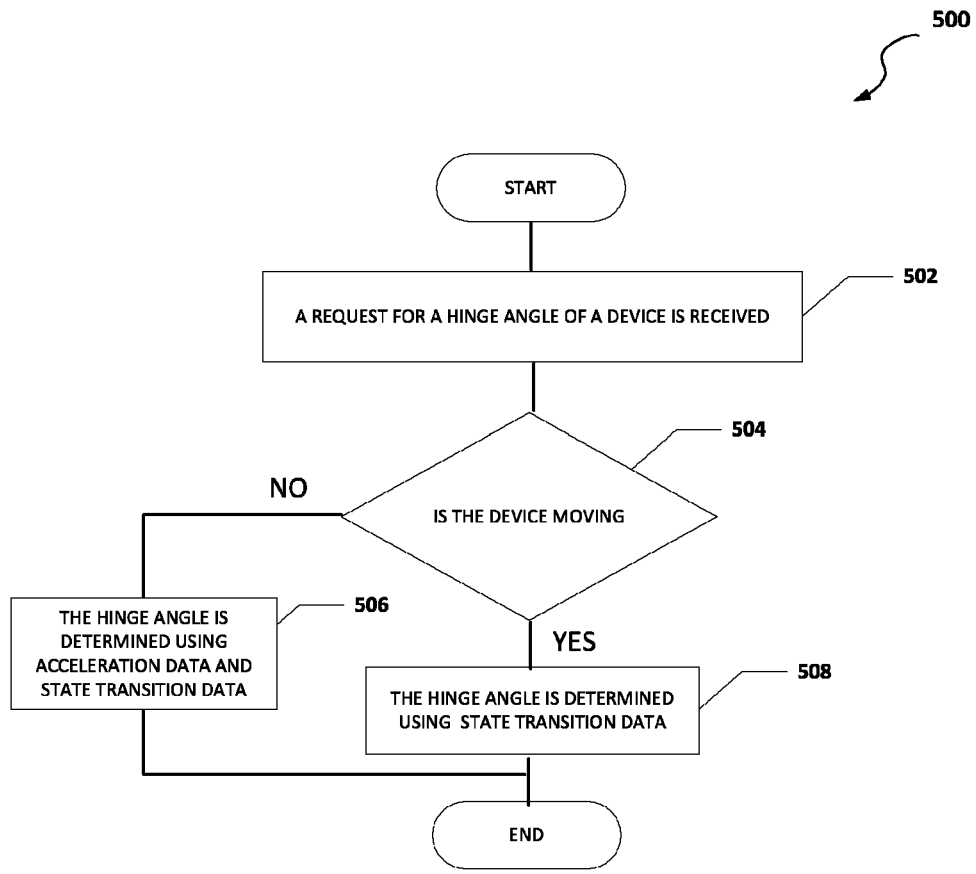
FIG. 5 is a simplified flowchart illustrating potential operations that may be associated with the system in accordance with an embodiment of the present disclosure.

Turning to FIG. 5, FIG. 5 is a is an example flowchart illustrating possible operations of a flow 500 that may be associated with enabling a hinge angle detection system, in accordance with an embodiment. In an embodiment, one or more operations of flow 500 may be performed by hinge angle detection engine 114, display orientation engine 116, and state transition engine 120. At 502, a request for a hinge angle of a device is received. At 504, the system determines if the device is moving. In an example, the device is moving it is in motion. If the device is not moving, then the hinge angle can be determined using acceleration data and state transition data, as in 506. For example, the acceleration data can be acquired from first housing accelerometer 110*a* and second housing accelerometer 110*b* and the state transition data can be acquired from state transition engine 120. If the device is moving, then the hinge angle can be determined using state transition data, as in 508. For example, the state transition data can be acquired from state transition engine 120. In an example, the device is moving if it is in motion.

Figure 6:
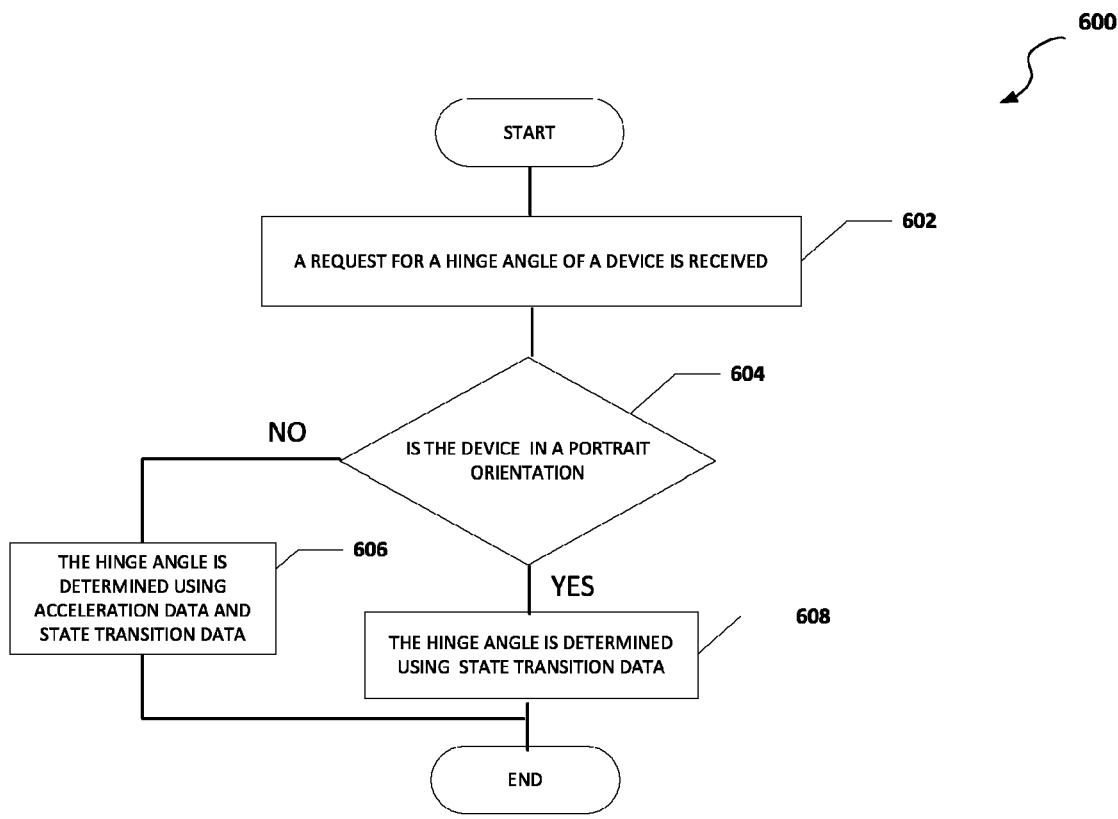
FIG. 6 is a simplified flowchart illustrating potential operations that may be associated with the system in accordance with an embodiment of the present disclosure.

Turning to FIG. 6, FIG. 6 is a is an example flowchart illustrating possible operations of a flow 600 that may be associated with enabling a hinge angle detection system, in accordance with an embodiment. In an embodiment, one or more operations of flow 600 may be performed by hinge angle detection engine 114, display orientation engine 116, and state transition engine 120. At 602, a request for a hinge angle of a device is received. At 604, the system determines if the device is in a portrait orientation. If the device is not in a portrait orientation, then the hinge angle can be determined using acceleration data and state transition data, as in 606. For example, the acceleration data can be acquired from first housing accelerometer 110*a* and second housing accelerometer 110*b* and the state transition data can be acquired from state transition engine 120. If the device is in a portrait orientation, then the hinge angle can be determined using state transition data, as in 608. For example, the state transition data can be acquired from state transition engine 120.

Figure 7:
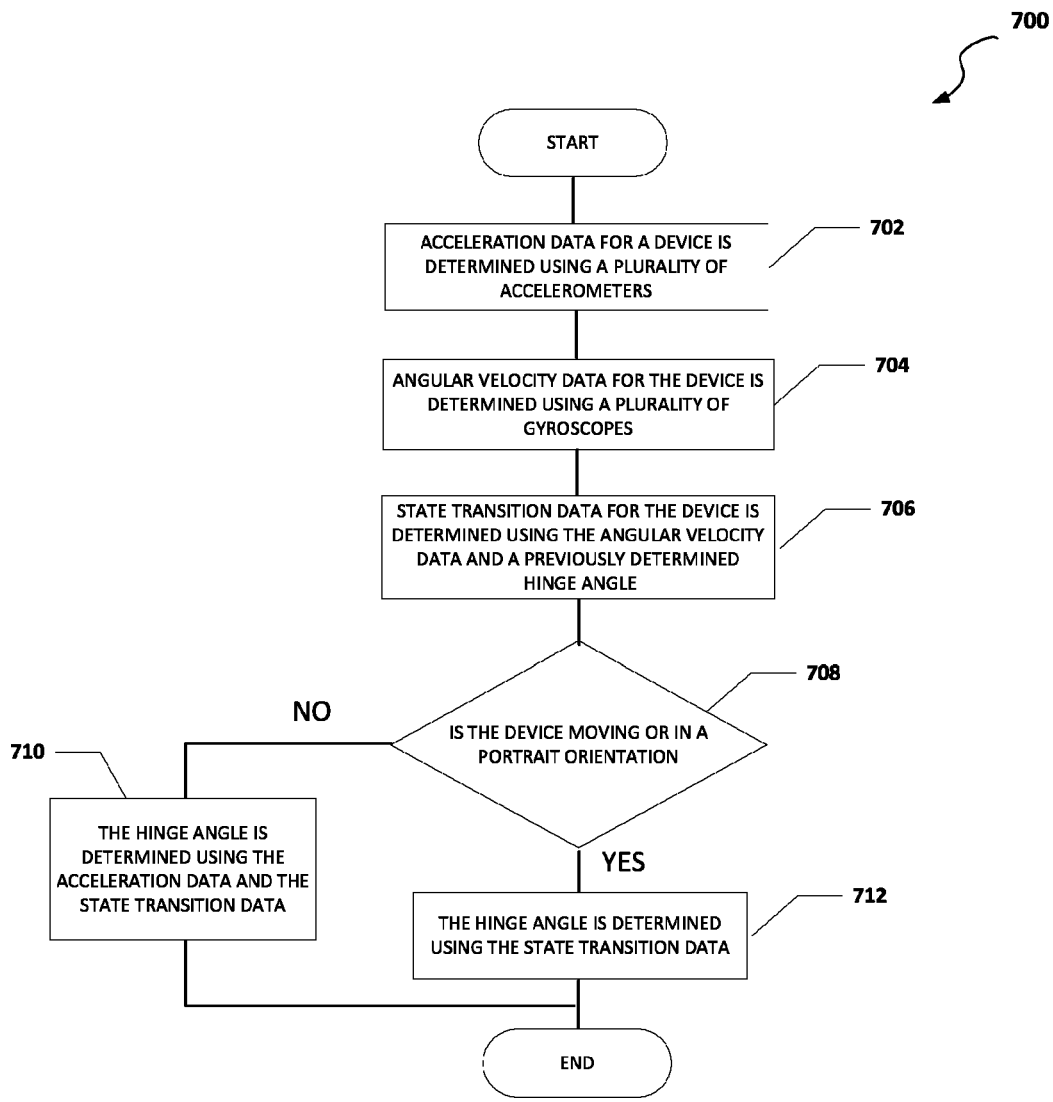
FIG. 7 is a simplified flowchart illustrating potential operations that may be associated with the system in accordance with an embodiment of the present disclosure.

Turning to FIG. 7, FIG. 7 is a is an example flowchart illustrating possible operations of a flow 700 that may be associated with enabling a hinge angle detection system, in accordance with an embodiment. In an embodiment, one or more operations of flow 700 may be performed by hinge angle detection engine 114, display orientation engine 116, and state transition engine 120. At 702, acceleration data for a device is determined using a plurality of accelerometers. For example, the acceleration data can be acquired from first housing accelerometer 110*a* and second housing accelerometer 110*b*. At 704, angular velocity data for the device is determined using a plurality of gyroscopes. For example, the angular velocity data can be acquired from first housing gyroscope 112*a* and second housing gyroscope 112*b*. At 706, state transition data for the device is determined using the angular velocity data and a previously determined hinge angle. At 708, the system determines if the device is moving or in a portrait orientation. In an example, the device is moving if it is in motion. If the device is not moving or in a portrait orientation, then the hinge angle can be determined using the acceleration data and the state transition data, as in 710. For example, the acceleration data can be acquired from first housing accelerometer 110*a* and second housing accelerometer 110*b* and the state transition data can be acquired from state transition engine 120. If the device is moving or is in a portrait orientation, then the hinge angle can be determined using the state transition data, as in 712. For example, the state transition data can be acquired from state transition engine 120.

Figure 8:
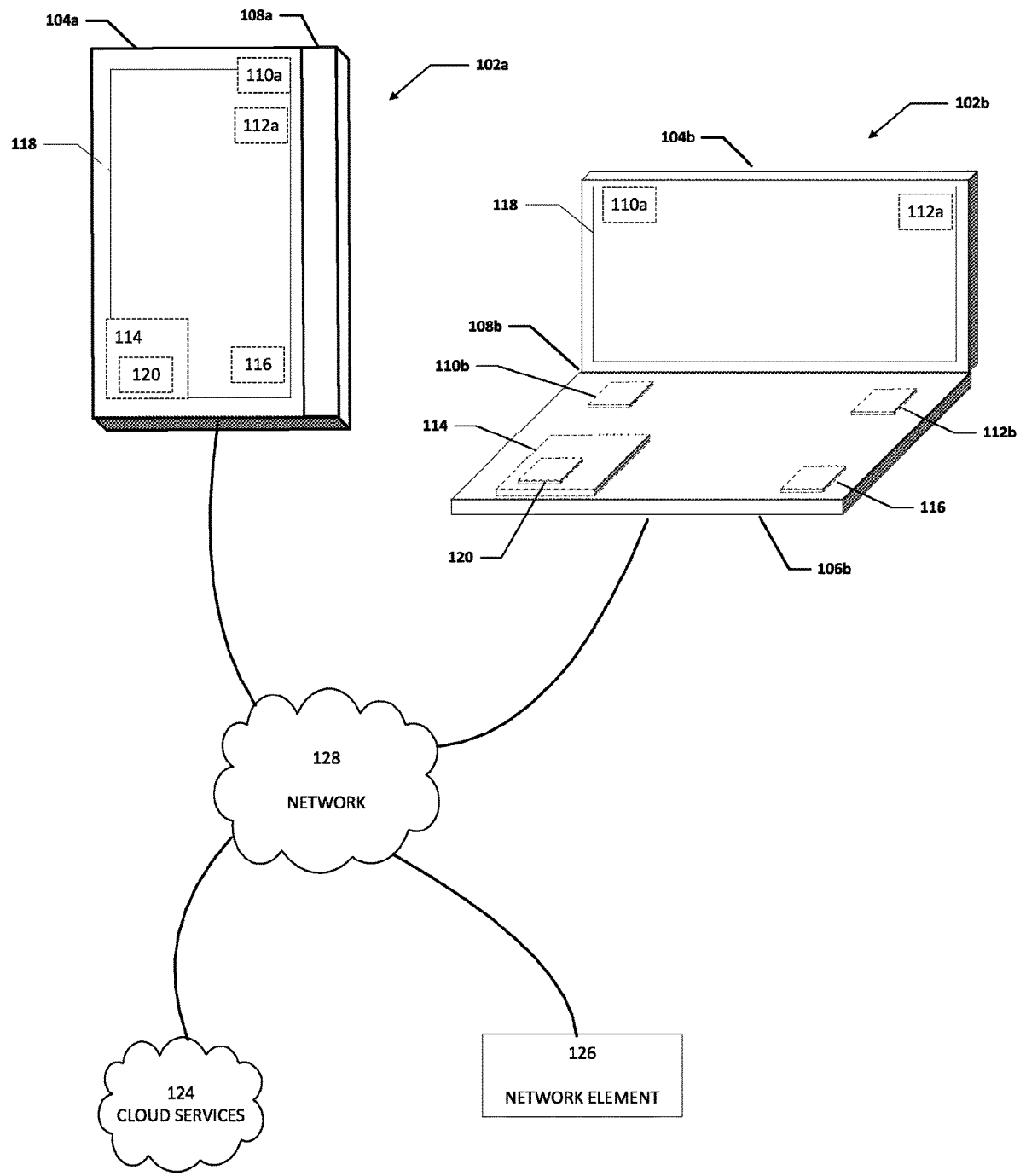
FIG. 8 simplified block diagram of systems to enable a hinge angle detection system, in accordance with an embodiment of the present disclosure.

Turning to FIG. 8, FIG. 8 is a simplified block diagram of electronic devices 102*a* and 102*b* configured to enable a hinge angle detection system, in accordance with an embodiment of the present disclosure. In an example, electronic device 102*a* can include a first housing 104*a* and a second housing (not shown). First housing 104*a* can be rotatably coupled to the second housing using a hinge 108*a*. First housing 104*a* can include at least one first housing accelerometer 110*a*, at least one first housing gyroscope 112*a*, hinge angle detection engine 114, display orientation engine 116, and first housing display 118. Hinge angle detection engine 114 can include a state transition engine 120. The second housing can include at least one second housing accelerometer, at least one second housing gyroscope, and a second housing display.

Electronic device 102b can include a first housing 104b and a second housing 106b. First housing 104b can be rotatably coupled to second housing 106b using a hinge 108b. First housing 104b can include at least one first housing accelerometer 110a, at least one first housing gyroscope 112a, and a first housing display 118. Second housing 106b can include at least one second housing accelerometer 110b, at least one second housing gyroscope 112b, hinge angle detection engine 114, and display orientation engine 116. Hinge angle detection engine 114 can include state transition engine 120. In an example, electronic device 102b is a laptop computer and second housing 106b can include a keyboard. First housing can be rotated about three hundred and sixty degrees relative to second housing 106b using hinge 108b.

Electronic devices 102a and 102b may each be a standalone device or in communication with cloud services 124 and/or one or more network elements 126 using network 128. Network 128 represents a series of points or nodes of interconnected communication paths for receiving and transmitting packets of information. Network 128 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 128, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

It is also important to note that the operations in the preceding flow diagrams (i.e., FIGS. 2-7) illustrates only some of the possible scenarios and patterns that may be executed by, or within, electronic devices 100, 100a, and 100b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic devices 100, 100a, and 100b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic devices 100, 100a, and 100b have been illustrated with reference to particular elements and operations that facilitate the communication process, these elements and operations may be replaced by any suitable architecture, protocols, and/or processes that achieve the intended functionality of electronic devices 100, 100a, and 100b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a first housing, where the first housing includes at least one first housing accelerometer and at least one first housing gyroscope, a second housing, where the second housing includes at least one second housing accelerometer and at least one second housing gyroscope, and a hinge, where the hinge rotatably couples the first housing to the second housing, where a hinge angle is determined using data from the first housing accelerometer, the second housing accelerometer, the first housing gyroscope, and the second housing gyroscope if the electronic device is not in a portrait orientation where the hinge is vertical to a ground or is not in motion.

In Example A2, the subject matter of Example A1 can optionally include where the hinge angle is determined using data from the first housing gyroscope and the second housing gyroscope, but not from the first housing accelerometer or the second housing accelerometer if the electronic device is in the portrait orientation or is in motion.

In Example A3, the subject matter of any one of Examples A1-A2 can optionally include where the hinge angle is determined using state transition data.

In Example A4, the subject matter of any one of Examples A1-A3 can optionally include a state transition engine, where the state transition engine is used to determine the state transition data based on angular velocity data from the first housing gyroscope and the second housing gyroscope.

In Example A5, the subject matter of any one of Examples A1-A4 can optionally include a state transition engine, where the state transition engine is used to determine the state transition data based on angular velocity data from the first housing gyroscope and the second housing gyroscope, where the hinge angle determined using the state transition data is corrected using the data from the first housing accelerometer and the second housing accelerometer.

In Example A6, the subject matter of any one of Examples A1-A5 can optionally include where a Kalman filter to determine the hinge angle.

In Example A7, the subject matter of any one of Examples A1-A6 can optionally include where the first housing can rotate about three hundred and sixty degrees relative to the second housing.

In Example A8, the subject matter of any one of Examples A1-A7 can optionally include where an image on a display is changed based on the determined hinge angle.

Example M1 is a method including determining that a first housing of an electronic device is rotated relative to a second housing of the electronic device about a hinge that rotatably couples the first housing to the second housing, determining acceleration data from a plurality of accelerometers, determining angular velocity data from a plurality of gyroscopes, determining the hinge angle based on the angular velocity data from the plurality of gyroscopes if the electronic device is in a portrait orientation where the hinge is vertical to a ground or is in motion, and determining a hinge angle based on the acceleration data from the plurality of accelerometers and the angular velocity data from the plurality of gyroscopes if the electronic device is not in the portrait orientation where the hinge is vertical to a ground or is not in motion.

In Example M2, the subject matter of Example M1 can optionally include where the first housing includes at least one first housing accelerometer and at least one first housing gyroscope and the second housing includes at least one second housing accelerometer and at least one second housing gyroscope.

In Example M3, the subject matter of any one of the Examples M1-M2 can optionally include determining the hinge angle using state transition data.

In Example M4, the subject matter of any one of the Examples M1-M3 can optionally include determining the state transition data based on angular velocity data from a first housing gyroscope and a second housing gyroscope and a previously determined hinge angle.

In Example M5, the subject matter of any one of the Examples M1-M4 can optionally include where a Kalman filter is used to determine the hinge angle.

In Example M6, the subject matter of any one of the Examples M1-M5 can optionally include where the first housing can rotate about three hundred and sixty degrees relative to the second housing.

In Example M7, the subject matter of any one of the Examples M1-M6 can optionally include changing an image on a display in the first housing based on the determined hinge angle.

Example S1 is a system for determining a hinge angle. The system can include a first housing, where the first housing includes at least one first housing accelerometer and at least one first housing gyroscope, a second housing, where the second housing includes at least one second housing accelerometer and at least one second housing gyroscope, a state transition engine, where the state transition engine is configured to determine state transition data, and a hinge. The hinge rotatably couples the first housing to the second housing, where a hinge angle is determined using data from the first housing accelerometer, the second housing accelerometer, and the state transition data if the system is not in a portrait orientation where the hinge is vertical to a ground or is not in motion and is determined using data from the state transition data if the system is in the portrait orientation where the hinge is vertical to a ground or is in motion.

In Example S2, the subject matter of Example S1 can optionally include where the state transition engine determines the state transition data based on angular velocity data from the first housing gyroscope and the second housing gyroscope and a previously determined hinge angle.

In Example S3, the subject matter of any one of the Examples S1-52 can optionally include where a Kalman filter is used to determine the hinge angle.

In Example S4, the subject matter of any one of the Examples S1-53 can optionally include where the first housing can rotate about three hundred and sixty degrees relative to the second housing.

In Example S5, the subject matter of any one of the Examples S1-S4 can optionally include where the first housing includes a first display and the second housing includes a second display.

Example AA1 is an apparatus including means for determining that a first housing of an electronic device is rotated relative to a second housing of the electronic device about a hinge that rotatably couples the first housing to the second housing, means for determining acceleration data from a plurality of accelerometers, means for determining angular velocity data from a plurality of gyroscopes, means for determining the hinge angle based on the angular velocity data from the plurality of gyroscopes if the electronic device is in a portrait orientation where the hinge is vertical to a ground or is in motion, and means for determining a hinge angle based on the acceleration data from the plurality of accelerometers and the angular velocity data from the plurality of gyroscopes if the electronic device is not in the portrait orientation where the hinge is vertical to a ground or is not in motion.

In Example AA2, the subject matter of Example AA1 can optionally include where the first housing includes at least one first housing accelerometer and at least one first housing gyroscope and the second housing includes at least one second housing accelerometer and at least one second housing gyroscope.

In Example AA3, the subject matter of any one of Examples AA1-AA2 can optionally include where means for determining the hinge angle using state transition data.

In Example AA4, the subject matter of any one of Examples AA1-AA3 can optionally include where means for determining the state transition data based on angular velocity data from a first housing gyroscope and a second housing gyroscope and a previously determined hinge angle.

In Example AA5, the subject matter of any one of Examples AA1-AA4 can optionally include where a Kalman filter is used to determine the hinge angle.

In Example AA6, the subject matter of any one of Examples AA1-AA5 can optionally include where the first housing can rotate about three hundred and sixty degrees relative to the second housing.

In Example AA7, the subject matter of any one of Examples AA1-AA6 can optionally include means for changing an image on a display in the first housing based on the determined hinge angle.

Example X1 is a machine-readable storage medium including machine-readable instructions to implement a method or realize an apparatus as in any one of the Examples A1-A8, AA1-AA7, or M1-M7. Example Y1 is an apparatus comprising means for performing any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
   a first housing, wherein the first housing includes a first housing display, at least one first housing accelerometer, and at least one first housing gyroscope;
   a second housing, wherein the second housing includes a second housing display, at least one second housing accelerometer, and at least one second housing gyroscope; and
   a hinge, wherein the hinge rotatably couples the first housing to the second housing and the first housing accelerometer, the first housing gyroscope, the second housing accelerometer, and the second housing gyroscope are all located near the hinge of the electronic device, wherein, if the electronic device is not in a portrait orientation where the hinge is vertical to a ground or is not in motion, a hinge angle is determined by subtracting an angle of the second housing relative to a horizontal plane from an angle of the first housing relative to the horizontal plane, wherein the angle of the first housing relative to the horizontal plane is determined using data from the first housing accelerometer and the angle of the second housing relative to the horizontal plane is determined using data from the second housing accelerometer.

2. The electronic device of claim 1, wherein the hinge angle is determined using data from the first housing gyroscope and the second housing gyroscope, but not from the first housing accelerometer or the second housing accelerometer if the electronic device is in the portrait orientation or is in motion.

3. The electronic device of claim 1, wherein the hinge angle is determined using state transition data.

4. The electronic device of claim 3, further comprising:
   a state transition engine, wherein the state transition engine is used to determine the state transition data based on angular velocity data from the first housing gyroscope and the second housing gyroscope.

5. The electronic device of claim 3, further comprising:
   a state transition engine, wherein the state transition engine is used to determine the state transition data based on angular velocity data from the first housing gyroscope and the second housing gyroscope, wherein the hinge angle determined using the state transition data is corrected using data from the first housing accelerometer and the second housing accelerometer.

6. The electronic device of claim 1, wherein a Kalman filter to determine the hinge angle.

7. The electronic device of claim 1, wherein the first housing can rotate about three hundred and sixty degrees relative to the second housing.

8. The electronic device of claim 1, wherein an image on a display is changed based on the determined hinge angle.

9. The electronic device of claim 1, wherein an angle of the first housing and the horizontal plane is determined by atan $2(a_{1z}/a_{1y})+\pi/2$, where $a_{1z}$ is a component of gravity on a Z axis of the first housing accelerometer and $a_{1y}$ is the component of gravity on a Y axis of the first housing accelerometer.

10. A method comprising:
    determining that a first housing of an electronic device is rotated relative to a second housing of the electronic device about a hinge that rotatably couples the first housing to the second housing, wherein the first housing includes a first housing display, at least one first housing accelerometer, and at least one first housing gyroscope and the second housing includes a second housing display, at least one second housing accelerometer, and at least one second housing gyroscope;
    determining an angle of the first housing relative to a horizontal plane using data from the first housing accelerometer;
    determining an angle of the second housing relative to the horizontal plane using data from the second housing accelerometer;
    determining angular velocity data from the at least one first housing gyroscope and the at least one second housing gyroscope;
    determining a hinge angle based on the angular velocity data from the at least one first housing gyroscope and the at least one second housing gyroscope if the electronic device is in a portrait orientation where the hinge is vertical to a ground or is in motion; and
    determining the hinge angle by subtracting the angle of the second housing relative to a horizontal plane from the angle of the first housing relative to the horizontal plane, if the electronic device is not in the portrait orientation where the hinge is vertical to a ground or is not in motion.

11. The method of claim 10, further comprising:
    determining the hinge angle using state transition data.

12. The method of claim 11, further comprising:
    determining the state transition data based on angular velocity data from a first housing gyroscope and a second housing gyroscope and a previously determined hinge angle.

13. The method of claim 10, wherein a Kalman filter is used to determine the hinge angle.

14. The method of claim 10, wherein the first housing can rotate about three hundred and sixty degrees relative to the second housing.

15. The method of claim 14, further comprising:
    changing an image on the first housing display in the first housing based on the determined hinge angle.

16. A system for determining a hinge angle, the system comprising:
    a first housing, wherein the first housing includes a first housing display, at least one first housing accelerometer and at least one first housing gyroscope;
    a second housing, wherein the second housing includes a second housing display, at least one second housing accelerometer and at least one second housing gyroscope;
    a state transition engine, wherein the state transition engine is configured to determine state transition data; and
    a hinge, wherein the hinge rotatably couples the first housing to the second housing, wherein if the system is not in a portrait orientation where the hinge is vertical to a ground or is not in motion, a hinge angle is determined by subtracting an angle of the second housing relative to a horizontal plane from an angle of the first housing relative to the horizontal plane, wherein the angle of the first housing relative to the horizontal plane is determined using data from the first housing accelerometer and the angle of the second housing relative to the horizontal plane is determined using data from the second housing accelerometer and the hinge angle is determined using data from the state transition data if the system is in the portrait orientation where the hinge is vertical to a ground or is in motion.

17. The system of claim 16, wherein the state transition engine determines the state transition data based on angular velocity data from the first housing gyroscope and the second housing gyroscope and a previously determined hinge angle.

18. The system of claim 16, wherein a Kalman filter is used to determine the hinge angle.

19. The system of claim 16, wherein the first housing can rotate about three hundred and sixty degrees relative to the second housing.

\* \* \* \* \*

UNITED STATES PATENT AND TRADEMARK OFFICE
CERTIFICATE OF CORRECTION

PATENT NO. : 11,809,237 B2
APPLICATION NO. : 17/763953
DATED : November 7, 2023
INVENTOR(S) : Cui et al.

It is certified that error appears in the above-identified patent and that said Letters Patent is hereby corrected as shown below:

In the Claims

In Column 17, Claim 6, Lines 51-52, delete "Kalman filter to" and insert -- Kalman filter is used to --, therefor.

Signed and Sealed this
Twenty-third Day of January, 2024

Katherine Kelly Vidal
*Director of the United States Patent and Trademark Office*